US005233443A

United States Patent [19]

Sugiyama

[11] Patent Number: 5,233,443

[45] Date of Patent: Aug. 3, 1993

[54] ORIGINAL READING APPARATUS HAVING A REDUCED SIZE AND THICKNESS

[75] Inventor: Hideaki Sugiyama, Shizuoka, Japan

[73] Assignee: Tokyo Electric Co., Ltd., Tokyo, Japan

[21] Appl. No.: 684,374

[22] Filed: Apr. 12, 1991

[30] Foreign Application Priority Data

Apr. 18, 1990 [JP] Japan .................................. 2-102405
Apr. 18, 1990 [JP] Japan .................................. 2-102406

[51] Int. Cl.[5] .............................................. H04N 1/04

[52] U.S. Cl. .................................... 358/497; 358/496

[58] Field of Search ......................... 358/473, 496–498

[56] References Cited

U.S. PATENT DOCUMENTS 4,496,984 1/1985 Stoffel ................................ 358/497
4,743,974 5/1988 Lockwood .......................... 358/496
4,835,619 5/1989 Kobori et al. ....................... 358/294
5,040,074 8/1991 Stemmle ............................ 358/496

FOREIGN PATENT DOCUMENTS 2169467 7/1986 United Kingdom .

*Primary Examiner*—Stephen Brinich
*Attorney, Agent, or Firm*—Oblon, Spivak, McClelland, Maier & Neustadt

[57] ABSTRACT

The invention provides an original reading apparatus which is small in overall thickness and size and light in weight. The original reading apparatus includes a body case having an original insertion opening formed in a wall thereof. An original transport passageway is formed substantially horizontally in the body case and communicated with the original insertion opening. A white roller of an original reading section and a feed roller for transporting an original are positioned along the original transport passageway and disposed in a horizontal position at a substantially same height.

11 Claims, 3 Drawing Sheets

ORIGINAL READING APPARATUS HAVING A REDUCED SIZE AND THICKNESS

FIELD OF THE INVENTION AND RELATED ART STATEMENT

This invention relates to an original reading apparatus for reading contents of an original, and more particularly to an original reading apparatus which is reduced in overall thickness and overall size to facilitate carrying thereof.

In recent years, original reading apparatuses which read contents of an original by an optical method or the like have been put into practical use and are employed for facsimile apparatuses copying apparatuses and so forth. Meanwhile, in the field of facsimile apparatuses or the like, it has been and is demanded to realize an apparatus of the portable type designed to facilitate carrying thereof. As an apparatus which can meet such demand, an apparatus of the structure has been put into practical use wherein an original reading apparatus for reading information of a picture image to be transmitted, a printing apparatus for printing picture image information received, a transmitter-receiver circuit for picture image information, an electric controlling section for controlling the transmitter-receiver circuit and so forth, and a power source apparatus for supplying power to the electric controlling section are accommodated in a body case and an operating section for the transmission and reception is provided on an upper face of the body case. In such an original reading apparatus of the structure suitable for carrying as described above, in order to reduce the apparatus in size to facilitate carrying thereof, an original reading section is normally employed which is constituted such that a contacting line image sensor is contacted with a white roller. While an original is normally transported to such original reading section by means of a feed roller, a stepping motor is commonly employed as means for driving such feed roller and/or white roller. In this instance, a rotary shaft of the stepping motor is connected to shafts of the rollers by way of a power transmitting mechanism such as a gear train.

Several problems of such prior art will be described subsequently. Facsimile apparatuses of the portable type have conventionally been put into practical use which include such an internal mechanism that an original transport passageway passing an original reading section is disposed at an inclination angle of about 45 degrees and a feed roller having an axis extending perpendicularly to the original transport passageway and a contacting line reading sensor and a white roller which serve as the original reading section are disposed in an upward and downward positional relationship in the inclined original transport passageway. Facsimile apparatuses of the construction cannot be reduced in overall height below a total dimension of a diametrical dimension of the feed roller and a vertical dimension of the reading section, and accordingly, they have a drawback that it is difficult to achieve a thin profile of the apparatus.

Further, where the original reading section has a structure wherein a closely contacting reading section is contacted with a white roller, the white roller commonly has a diameter greater than 20 mm or so in order to assure a certain amount of nip of the image sensor with respect to the white roller. In particular, when such original reading section is produced, a contacting error will take place between the white roller and the image sensor without fail and it is very difficult to eliminate such contacting error completely. Consequently, the reading accuracy of the original reading section depends upon the nip amount of the image sensor with respect to the white roller, and the smaller the nip amount, the smaller the tolerance of the contacting error between the white roller and the image sensor. On the other hand, the magnitude of the nip amount of the image sensor with respect to the white roller depends upon the diameter of the white roller, and the smaller the diameter of the white roller, the smaller the nip amount. Accordingly, in order to assure accurate reading of an original at the original reading section, it is necessary to make the diameter of the white roller greater than a particular value, and the minimum value of such diameter is 20 mm or so. Consequently, facsimile apparatuses of the type just mentioned have a drawback in that the overall thickness thereof cannot be reduced below a total dimension of a diameter of 20 mm or so of the white roller and a thickness of the image sensor.

Further, in such a conventional apparatus as described above, the rollers and a stepping motor for driving the rollers are disposed such that axes thereof extend in parallel to each other. Consequently, the vertical dimension of the apparatus cannot be reduced below a diameter of the stepping motor. Also from this reason, the conventional apparatus has a drawback in that the apparatus cannot be reduced in thickness. It is to be noted that, while it may be recommendable to employ a stepping motor of a small diameter, this is not practical because a sufficient output power to drive the rollers cannot be obtained from such small diameter stepping motor.

OBJECTS AND SUMMARY OF THE INVENTION

It is a first object of the present invention to provide an original reading apparatus which can be reduced in overall thickness.

It is a second object of the present invention to provide an original reading apparatus which can be reduced in overall thickness and overall weight.

In order to attain the objects, according to the present invention, there is provided an original reading apparatus which comprises a body case, means for defining an original insertion opening perforated in a wall of the body case, means for defining a substantially horizontally extending original transport passageway in a communicating relationship with the original insertion opening, a feed roller disposed for transporting an original introduced into the original transport passageway from the original insertion opening, an original reading section including a white roller disposed in a horizontal position at a substantially same height as the feed roller and having an axis extending substantially in parallel to an axis of the feed roller for transporting the original transported from the feed roller and a closely contacting line reading sensor extending in parallel to the axis of the white roller for contacting with the white roller across the original transport passageway to read data of the original being transported by the white roller, a motor for driving the feed roller and the white roller, an electric controlling section for electrically controlling the motor and the closely contacting line reading sensor, and a power source section for supplying electric power to the motor, the closely contacting line reading sensor and the electric controlling section. Accordingly, an original introduced into the original transport passageway from the original insertion opening is transported by the feed roller and the white roller, and during such transportation, contents of the original are read by the original reading section. The data thus read by the original reading section are suitably processed by the electric controlling section. As such processing, for example, the read data may be transmitted over a telephone network or stored into a memory, or such stored data in the memory may be outputted to a printer separate from the facsimile apparatus. On the other hand, since the original transport passageway is formed substantially horizontally and the feed roller and white roller are disposed, as the positions of the axes thereof, in a horizontal position at a substantially same height, the entire apparatus can be formed thin in thickness, small in size and light in weight.

DESCRIPTION OF THE PREFERRED EMBODIMENT

Figure 1:
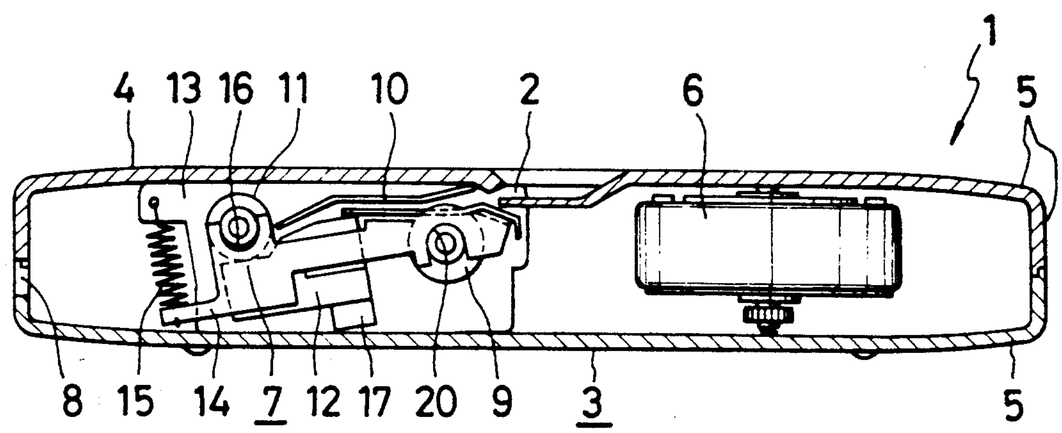
FIG. 1 is a vertical sectional side elevational view of an entire original reading apparatus showing an embodiment of the present invention.
Figure 2:
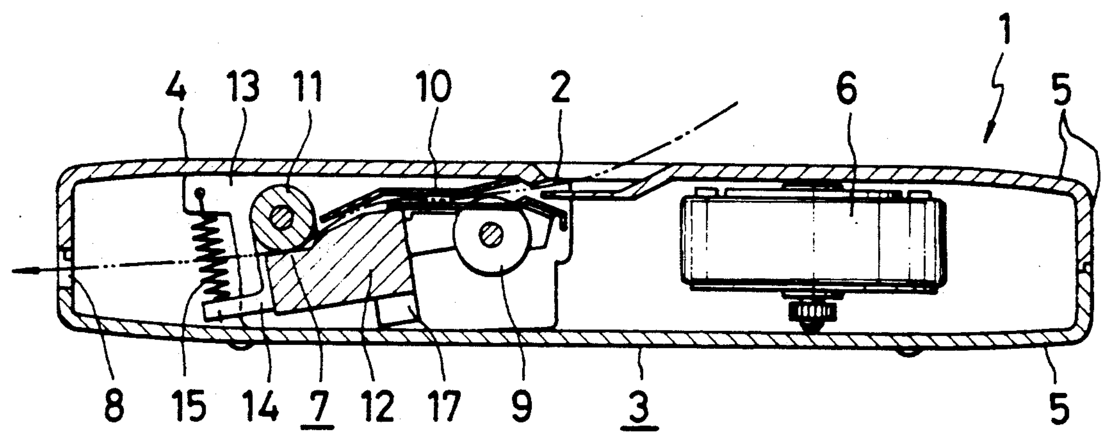
FIG. 2 is a similar view but showing an original reading section of the original reading apparatus of FIG. 1 in section.
Figure 5:
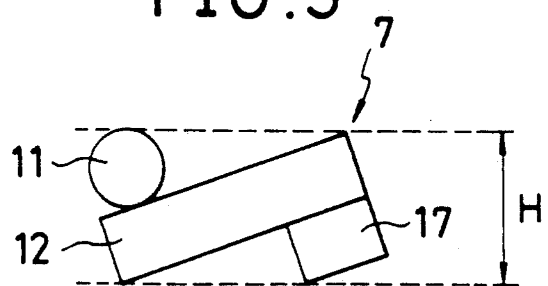
FIG. 5 is a diagrammatic side elevational view illustrating a height of the original reading section of FIG. 2.
Figure 6:
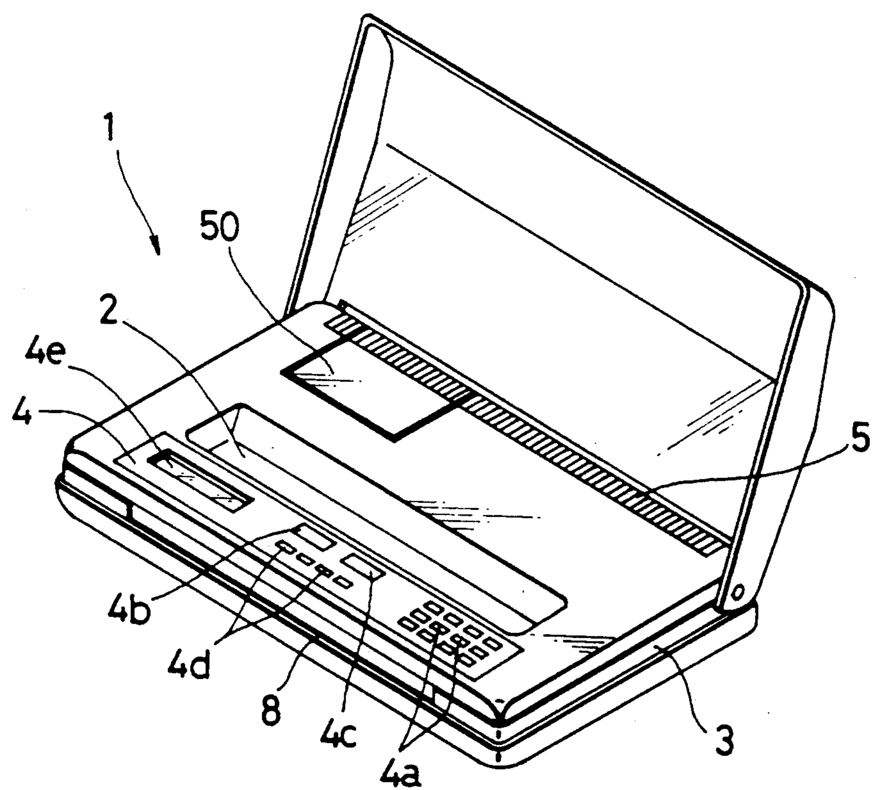
FIG. 6 is a perspective view showing an appearance of the entire original reading apparatus of FIG. 1.

An original reading apparatus of an embodiment of the present invention will be described with reference to FIGS. 1 to 6. The original reading apparatus of the present embodiment is in the form a facsimile apparatus 1. Referring first to FIG. 6, the facsimile apparatus 1 includes a body case 3 of a generally flattened profile. An original insertion opening 2 in the form of a slit for inserting an original into the facsimile apparatus 1 therethrough is formed at a substantially mid portion of an upper wall of the body case 3, and an operating section 4 is disposed at a front portion of the upper wall of the body case 3 while a gripping section 5 for facilitating holding of the apparatus by a hand is formed at a rear edge portion of the upper wall of the body case 3. The original insertion opening 2, operating section 4 and gripping section 5 are disposed such that the lengths thereof coincide with the longitudinal direction, that is, leftward and rightward directions, of the body case 3. Further, as illustrated in FIGS. 1 and 2, an original discharging opening 8 in the form of a slit is formed in a front end wall of the body case 3, and an original transport passageway 10 is formed substantially horizontally in the inside of the body case 3 such that it establishes communication between the original discharging opening 8 and original insertion opening 2 past below the operating section 4. A feed roller 9 is disposed in the neighborhood of the original insertion opening 2 such that an axis thereof extends perpendicularly to the original transport passageway 10 while an original reading section 7 is disposed adjacent another central location of the original transport passageway 10. Here, the original reading section 7 is formed such that a white roller 11 disposed in a horizontal position at a substantially same height as the feed roller 9 and an image sensor 12 in the form of a closely contacting line reading sensor for contacting with the white roller 11 in a condition a little inclined from a horizontal plane are disposed in an opposing relationship to each other across the original transport passageway 10. The image sensor 12 is disposed between rotary shafts 9*a* and 11*a* of the feed roller 9 and white roller 11. Further, a stepping motor 6 having a flattened general profile is disposed at a rear location in the inside of the body case 3 and is connected to the feed roller 9 and white roller 11 by way of a power transmitting mechanism 30. The stepping motor 6, feed roller 9 and original reading section 7 are disposed in a juxtaposed relationship in this order in a horizontal position at a substantially same height.

Here, the original reading section 7 will be described in more detail. First, the white roller 11 is formed with a very small diameter of about 10 mm, and the white roller 11 and the feed roller 9 are supported for rotation on a mechanism frame 13 secured in the body case 3. Meanwhile, the image sensor 12 is secured in an inclined condition to a positioning frame 14 which is supported for pivotal motion on the rotary shaft 9*a* of the feed roller 9. The positioning frame 14 is normally urged upwardly by a spring 15 which extends between the positioning frame 14 and the mechanism frame 13. The positioning frame 14 has a U-shaped recess 20 formed at a rear end portion thereof for fitting with the rotary shaft 9*a* of the feed roller 9. Accordingly, the image sensor 12, white roller 11 and feed roller 9 are positioned relative to each other by the positioning frame 14. It is to be noted that a connector 17 is provided at an end portion of a lower face of the image sensor 12 and extends downwardly. Consequently, the overall height of the original reading section 7 is reduced as the image sensor 12 is disposed in an inclined condition as illustrated in FIG. 5.

Figure 3:
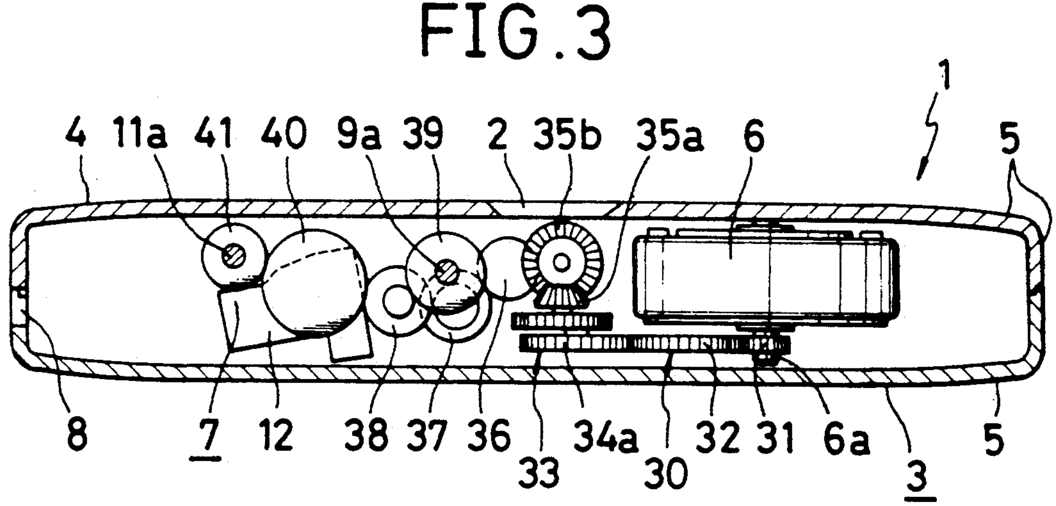
FIG. 3 is a similar view but showing a power transmitting mechanism of the original reading apparatus of FIG. 1.
Figure 4:
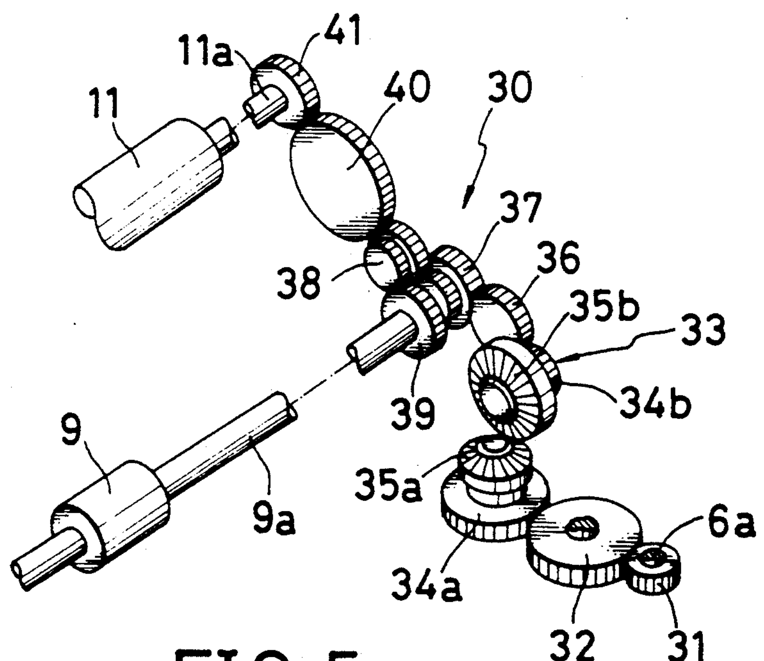
FIG. 4 is a perspective view of the power transmitting mechanism of FIG. 3.

Subsequently, the power transmitting mechanism 30 has a structure wherein an input power shaft and an output power shaft extend perpendicularly to each other as illustrated in FIGS. 3 and 4. In particular, the stepping motor 6 is disposed such that a rotary shaft 6*a* thereof is directed in a vertical direction, and a drive gear 31 is secured to the rotary shaft 6*a* of the stepping motor 6. An outputting direction changing gear train 33 is connected to the drive gear 31 by way of a first idler gear 32. The outputting direction changing gear train 33 includes a pair of gears including a pair of spur gears 34*a* and 34*b* and another pair of bevel gears 35*a* and 35*b* formed in a coaxial relationship to each other, respectively, with the bevel gears 35*a* and 35*b* held in meshing engagement with each other and changes the inputting direction and the outputting direction by 90 degrees by meshing engagement between the bevel gears 35*a* and 35*b*. In particular, the first idler gear 32 is connected to the outputting direction changing gear train 33 as it is engaged with the spur gear 34*a*, and the spur gear 34*b* of the outputting direction changing gear train 33 is connected to a fourth idler gear 38 by way of second and third idler gears 36 and 37. Then, a follower gear 39 secured to the rotary shaft 9*a* of the feed roller 9 is connected to the fourth idler gear 38 while another follower gear 41 secured to the rotary shaft 11a of the white roller 11 is connected to the fourth idler gear 38 by way of a fifth idler gear 40.

Further, the operating section 4 includes ten keys 4a, a start key 4b and a stop key 4c as well as various function keys 4d, a liquid crystal display section 4e and so forth. Meanwhile, the gripping section 5 has a structure suitable for the gripping by providing antislipping processing to a surface thereof, for example, such that the surface thereof is covered with a rubber layer on which a large number of depressions or recessed grooves are formed successively. Then, an electric controlling section not shown for executing driving control of various electric components and a power source section 50 for supplying an electric power to the various electric components including the operating section 4 and the stepping motor 6. Here, the power source section 50 is removably mounted at a rear end of the body case 3 in a horizontal direction as illustrated in FIG. 6.

With the facsimile apparatus 1 of such construction as described above, an original is first inserted into the original insertion opening 2 while the facsimile apparatus 1 is connected to an external circuit by way of a cable not shown, and then a facsimile number of the other party is inputted by way of the ten keys 4a, and after then, the start key 4b of the operating section 4 is depressed. Consequently, a connected condition of the circuit with the other party is established and thereafter maintained so that a transmitting operation of picture image information of the original is performed. In particular, the stepping motor 6 is driven under the control of the electric controlling section to rotate the rotary shaft 6a thereof, and such rotation of the rotary shaft 6a is transmitted to the rollers 9 and 11 by way of the power transmitting mechanism 30. More particularly, the drive gear 31 secured to the rotary shaft 6a is rotated, and such rotation is transmitted by way of the first idler gear 32 to the outputting direction changing gear train 33 in which the outputting direction is changed by 90 degrees from the inputting direction, whereafter it is transmitted to the fourth idler gear 38 by way of the second and third idler gears 36 and 37. Then, the rotation of the fourth idler gear 38 is transmitted to the follower gear 39 to rotate the feed roller 9 while it is also transmitted to the other follower gear 41 to rotate the white roller 11, and the original is transported along the original transport passageway 10 by such rotation of the rollers 9 and 11. The transporting original forces a pivoting movement of the frame 14 on which the image sensor 12 is secured against the urging of the spring 15. During such transportation of the original, picture image information of the original is read by the image sensor 12, as the original passes between the white roller 11 and the image sensor 12. Thus read picture image information is transmitted from the transmitting circuit of the electric controlling section to the external circuit. On the other hand, a reproducing operation of such picture image information is performed with a facsimile apparatus (not shown) of the other party which receives the thus transmitted picture image information from the facsimile apparatus 1.

It is to be noted that, upon such reading and transmitting operations of picture image information of the original, presence or absence of the original being transported or transporting conditions of the original such as a transporting speed are detected by transport detecting means not shown which is formed from a photosensor or the like, and the components of the facsimile apparatus 1 are controlled by the electric controlling section while referring to a result of such detection.

Meanwhile, in the facsimile apparatus 1, since the original transport passageway 10 is formed substantially horizontally and the feed roller 9 and the white roller 11 are disposed substantially horizontally, the entire apparatus can be formed with a small thickness.

Such small thickness of the entire apparatus is realized also by the construction wherein the stepping motor 6 of a generally flattened profile is disposed such that the rotary shaft 6a thereof is directed in a vertical direction and the rotary shaft 6a is connected by way of the power transmitting mechanism 30 to the rotary shafts 9a and 11a of the rollers 9 and 11 which are directed in a horizontal direction.

Also, the fact that the diameter of the white roller 11 is small at about 10 mm contributes to reduction in overall size and overall thickness of the apparatus. Here, if the white roller 11 is reduced in diameter, then generally the nip amount of the image sensor 12 with respect to the white roller 11 is reduced and the reading accuracy is deteriorated as described hereinabove. According to the original reading apparatus of the present embodiment, however, since the white roller 11 and the image sensor 12 are held on the positioning frame 14 to improve the relative positioning accuracy of them, even if the diameter of the white roller 11 is reduced to almost 10 mm, a sufficiently high reading accuracy is maintained. Accordingly, reduction in overall thickness, overall size and overall weight of the apparatus involved in reduction in diameter of the white roller 11 is achieved.

Further, since the image sensor 12 is a closely contacting line reading sensor having the connector 17 provided projectingly at the rear end portion of the lower face thereof and is disposed in an inclined condition in the original transport passageway 10 in an intersecting relationship to the original transport passageway 10, the overall height of the original reading section 7 is reduced by a distance substantially equal to a height of the connector 17. From a different point of view, an effective spacing is produced at a location at which the connector 17 is disposed due to the fact that the image sensor 12 is disposed in such an inclined condition as described above. Thus, in the present embodiment, the connector 17 is disposed in such effective spacing so that the depthwise dimension of the apparatus which may be increased if the connector 17 is otherwise disposed in a horizontally extending condition at the rear end of the image sensor 12 is decreased. Accordingly, reduction in overall size and overall thickness is achieved.

It is to be noted that it has been confirmed by the applicant that, even where the facsimile apparatus 1 of such structure as described above is designed such that an original, for example, at least of the A4 size or the letter size can be read smoothly and well, the body case 3 can be produced with the thickness of 30 mm or so.

Thus, since the facsimile apparatus 1 is reduced in overall thickness, overall size and overall weight, the portability of the apparatus is improved and a transmitting operation while the apparatus is held by one hand can be performed readily.

It is to be noted that, while the facsimile apparatus 1 of the present embodiment is shown including, as the power transmitting mechanism 30 wherein the axes of the input power shaft and the output power shaft extend perpendicularly to each other, the gear train including a pair of bevel gears 35*a* and 35*b*, the present invention is not limited to the specific arrangement, and for example, a gear train which includes a worm gear or a crown gear, a wrapping transmission mechanism including a combination of a belt and a pulley, or the like may be employed for such power transmitting mechanism 30.

What is claimed is:

1. An original reading apparatus, comprising:

a body case;

means for defining an original insertion opening perforated in a wall of said body case;

means for defining a substantially horizontally extending original transport passageway in a communicating relationship with said original insertion opening;

a feed roller disposed for transporting an original introduced into said original transport passageway from said original insertion opening;

an original reading section including a white roller disposed in a horizontal position at a substantially same height as said feed roller and having an axis extending substantially in parallel to an axis of said feed roller for transporting the original transported from said feed roller, and a closely contacting line reading sensor extending in parallel to the axis of said white roller for contacting with said white roller across said original transport passageway and being away from contact with said white roller for permitting a passage of the original between the white roller and the reading sensor for reading data of the original as the original is transported between said white roller and said reading sensor;

a motor for driving said feed roller and said white roller;

an electric controlling section for electrically controlling said motor and said closely contacting line reading sensor; and a power source section for supplying electric power to said motor, said closely contacting line reading sensor and said electric controlling section.

2. An original reading apparatus according to claim 1, wherein said closely contacting line reading sensor for contacting with said white roller is disposed in a condition a little inclined from a horizontal plane.

3. An original reading apparatus according to claim 2, wherein a connector for the connection to said electric controlling section is mounted at an end portion of an upper face or a lower face of said closely contacting line reading sensor.

4. An original reading apparatus according to claim 1, wherein said closely contacting line reading sensor is disposed between rotary shafts of said feed roller and said white roller in parallel to said rotary shafts.

5. An original reading apparatus according to claim 1 or 2, wherein said closely contacting line reading sensor and said white roller are positioned on and between a pair of opposing positioning frames.

6. An original reading apparatus according to claim 1, wherein said motor has a generally flattened outer profile and is disposed such that a rotary shaft thereof is directed in a vertical direction.

7. An original reading apparatus according to claim 1, wherein said motor is connected to said feed roller and said white roller by way of a power transmitting mechanism.

8. An original reading apparatus according to claim 7, wherein said power transmitting mechanism is formed from a gear train.

9. An original reading apparatus according to claim 1, wherein said original insertion opening is formed in an upper wall of said body case.

10. An original reading apparatus according to claim 9, wherein said original insertion opening is formed at the center of said body case.

11. An original reading apparatus according to claim 9, wherein said original insertion opening is formed at the center of said body case, and a gripping section is provided at a rear end of said upper wall of said body case while an operating section is disposed at a front end of said upper wall of said body case.

* * * * *